(12) United States Patent
Philipp

(10) Patent No.: US 11,267,652 B2
(45) Date of Patent: Mar. 8, 2022

(54) TEMPORARY STORE

(71) Applicant: Rotzinger AG, Kaiseraugst (CH)

(72) Inventor: Kurt Philipp, Grenzach-Wyhlen (DE)

(73) Assignee: ROTZINGER AG, Kaiseraugst (CH)

( * ) Notice: Subject to any disclaimer, the term of this patent is extended or adjusted under 35 U.S.C. 154(b) by 0 days.

(21) Appl. No.: 16/956,614

(22) PCT Filed: Dec. 21, 2018

(86) PCT No.: PCT/EP2018/086601
§ 371 (c)(1),
(2) Date: Jun. 22, 2020

(87) PCT Pub. No.: WO2019/122335
PCT Pub. Date: Jun. 27, 2019

(65) Prior Publication Data
US 2020/0399062 A1    Dec. 24, 2020

(30) Foreign Application Priority Data

Dec. 22, 2017 (CH) ...................................... 1612/17

(51) Int. Cl.
*B65G 1/10* (2006.01)
*B65G 17/16* (2006.01)
(Continued)

(52) U.S. Cl.
CPC ............... *B65G 1/10* (2013.01); *B65G 17/16* (2013.01); *B65G 17/32* (2013.01); *B65G 17/485* (2013.01);
(Continued)

(58) Field of Classification Search
CPC .......... B65G 1/10; B65G 17/16; B65G 17/32; B65G 17/485; B65G 47/57; B65G 47/61; B65G 2201/0202; B65G 47/5122
(Continued)

(56) References Cited

U.S. PATENT DOCUMENTS 4,142,626 A * 3/1979 Bradley ............. B65G 47/5122
198/794
5,018,334 A * 5/1991 Guttinger ............. B65G 47/082
198/429
(Continued)

FOREIGN PATENT DOCUMENTS

EP    0506551 A1    9/1992

OTHER PUBLICATIONS

International Search Report and Written Opinion dated Apr. 9, 2019 for PCT/EP2018/086601 filed on Dec. 21, 2018, 10 pages including English Translation of the International Search Report.

*Primary Examiner* — Mark A Deuble
(74) *Attorney, Agent, or Firm* — Xsensus LLP

(57) ABSTRACT

The temporary store has circulating continuous chains on both sides of the product conveyor section, said continuous chains running through vertical chain loops via upper and lower deflections. Product carrier gondolas with product carriers are suspended on the chains, said product carriers being used to receive incoming products and convey the products to a product outlet. Each chain runs through an inlet-side and an outlet-side vertical loop. The upper deflections of the chain loops can be moved vertically in opposite directions.

5 Claims, 2 Drawing Sheets

(51) Int. Cl.
*B65G 17/32* (2006.01)
*B65G 17/48* (2006.01)
*B65G 47/57* (2006.01)
*B65G 47/61* (2006.01)
*B65G 47/51* (2006.01)

(52) U.S. Cl.
CPC ......... *B65G 47/5122* (2013.01); *B65G 47/57* (2013.01); *B65G 47/61* (2013.01); *B65G 2201/0202* (2013.01)

(58) Field of Classification Search
USPC .......................................... 198/347.1, 347.4
See application file for complete search history.

(56) References Cited

U.S. PATENT DOCUMENTS

| | | | | |
|---|---|---|---|---|
| 5,271,489 | A * | 12/1993 | Helmstetter | B65G 47/5122 198/347.1 |
| 5,339,942 | A * | 8/1994 | Gasser | B65G 47/22 198/347.1 |
| 5,735,380 | A * | 4/1998 | Schneider | B65G 1/127 198/347.1 |
| 6,846,145 | B2 * | 1/2005 | Remericq | B65B 35/04 198/594 |
| 8,490,772 | B2 * | 7/2013 | Michler | B65G 47/5122 198/347.1 |
| 9,132,962 | B2 * | 9/2015 | Cicalini | B65G 17/42 |
| 2003/0234601 | A1 * | 12/2003 | Spettl | B65G 47/5122 312/319.5 |
| 2004/0035678 | A1 * | 2/2004 | Biondi | B65G 47/57 198/347.1 |
| 2013/0153363 | A1 * | 6/2013 | Hirschek | B65G 37/00 198/347.3 |

\* cited by examiner

TEMPORARY STORE

CROSS-REFERENCE TO RELATED APPLICATION

The present application is based on PCT filing PCT/EP2018/086601, filed Dec. 21, 2018, which claims priority to CH 1612/17, filed Dec. 22, 2017, the entire contents of each are incorporated herein by reference.

BACKGROUND OF THE INVENTION

Field of the Invention

The invention relates to a temporary store integrated into a product conveyor section for receiving according to the preamble of claim 1.

Description of Related Art

Efficiency is becoming increasingly important in modern production lines in the food industry. Freshly produced bulk goods, such as chocolate bars, as well as all kinds of biscuits, should get into the packaging facilities by the shortest route. Depending on the production rate, one or more packaging machines are placed next to the main belt line and served with the necessary number of products via discharge units. Here, the packaging machines should be loaded with product if possible without interruptions, dynamic pressure and continuously. The takeover of the products from the production facilities and the delivery of the products to the packaging machines are mainly carried out by means of conveyor belts. Since usually several packaging machines are arranged in a row to form a so-called packaging branch, the entire packaging branch is immediately stopped in the event of a machine malfunction and is therefore no longer available to the packaging line. Since the production process should run as consistently as possible in order to enable a uniform quality of the products, a corresponding number of products would be in excess as a result of stops in the packaging process and would therefore be waste. To avoid this, temporary stores are used that can receive a certain number of products that would otherwise have been in excess. The use of such temporary stores can thus increase the efficiency of the entire packaging line, because if the dimensions are correct (size of the temporary store), products in excess should no longer be created.

Normally, the total output of the packaging system should be at least 20% greater than the production rate.

If this is the case, the speed of the downstream packaging machines can be increased depending on the storage level. The higher the filling level of the store, the faster the packaging machines can be loaded with products from the store. This can counteract an impending overfilling of the store at an early stage. Such a temporary store is typically located at the end of the line and can then be used to load up to two packaging machines with products. Such a temporary store works according to the "first-in, first-out" (FIFO) principle, which is usually prescribed for the handling of unpacked food. The temporary store is functionally looped into the production flow and the order of the products is retained, mixing is avoided and traceability is retained.

Known temporary stores for this use are, for example, vertical temporary stores that make use of the room to its full height and require a small footprint. These vertical stores each have a continuous chain running synchronously on each side of the conveyor section in a frame, product carriers being arranged between the two chains transversely to the conveying direction. The pair of continuous chains runs in vertical loops via fixed upper and lower deflections, which are positioned in the frame in a stationary manner. In these chain loops arranged in pairs, vertically movable carriages are looped with deflections which divide the chains into an upper and a lower area. By moving the carriages upwards, the upper area of the chains is shortened and at the same time the lower area is lengthened, while moving the carriages downwards has the opposite effect.

The pair of chains is evenly equipped with driver bolts in a circulating manner, in which the product carrier gondolas are rotatably suspended in a circulating manner. These gondolas usually have four to six flat product carriers or trays on which the products arranged in rows can usually be loaded cyclically in the frontal direction at the inlet of the temporary store.

The stored products arranged in rows are transported through the upper area of the temporary store to its outlet. The transport through the store takes place in cycles, synchronized with the cycle rate of the products arranged in rows on the incoming main conveyor. As soon as the minimum throughput section in the upper area of the temporary store is filled with products arranged in rows, the cyclical discharge of the products arranged in rows in the outlet of the temporary store can begin. An outlet drive of the temporary store moves the chain pair equipped with product carrier gondolas in a downward direction towards the outlet level. The outled drive of the temporary store is synchronized with the packaging speed. Thus, the cycle rate of the downward moving chain always depends on the current packaging speed, which, as described above, is controlled in accordance with the filling level of the temporary store.

Because of the fixed deflections, these known temporary stores require a large minimum filling, that is to say a large number of filled product carriers between the inlet and outlet, even when the upper region is shortened to a maximum. The minimum filling depends on the height of the store and the number of chain loops. Since these stores are often very high (e.g. 8 m) and the upper chain strand must always be filled with product, around 360 rows of products are required for the minimum filling. This large number of rows of products must be filled in and removed at the start and at the end of each production run. With an output of, for example, 30 rows per minute, this results in 22 minutes dead time (inefficiency) per production run.

SUMMARY OF THE INVENTION

The invention has for its object to remedy this disadvantage of the known temporary stores.

According to the invention, this is achieved with a temporary store of such as that of the type disclosed herein.

BRIEF DESCRIPTION OF THE DRAWINGS

A preferred exemplary embodiment of the temporary store according to the invention is described below with reference to the accompanying drawings. The Figures show.

DETAILED DESCRIPTION OF THE PREFERRED EMBODIMENTS

Figure 1:
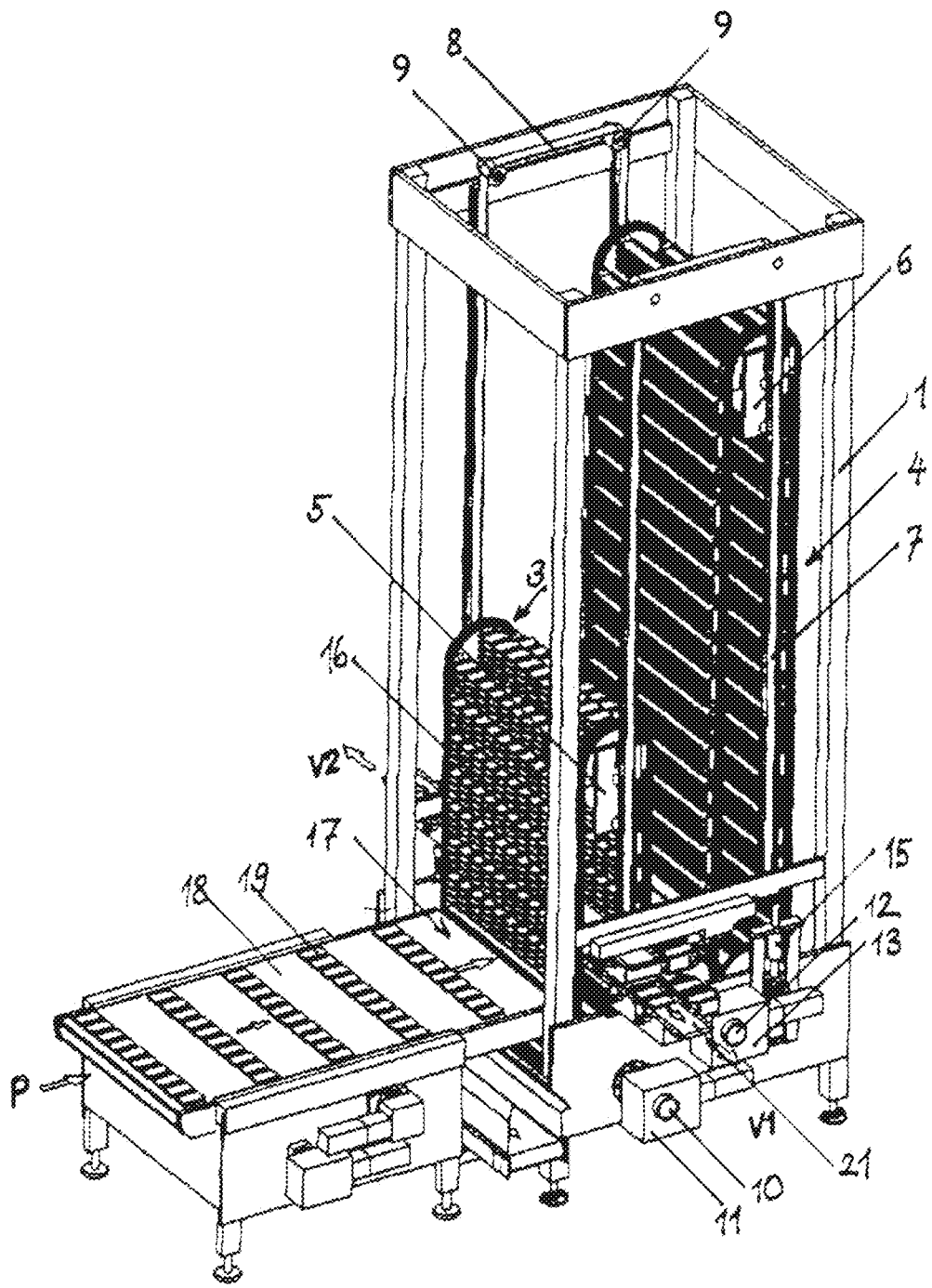
FIG. 1 a perspective view of a temporary store
Figure 2:
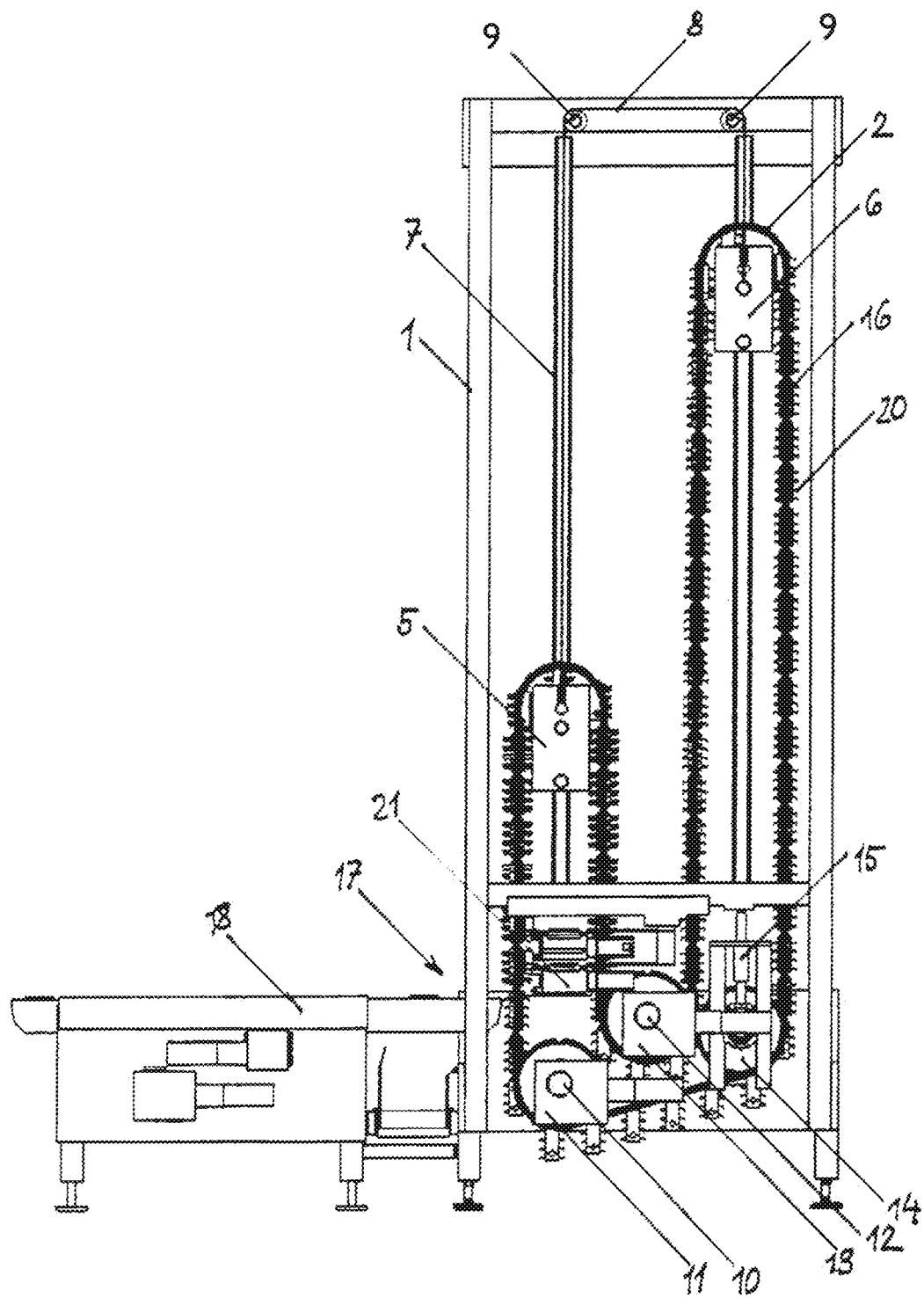
FIG. 2 a side view of the temporary store shown in FIG. 1.

In a frame 1, in a manner known per se, two circulating continuous chains 2 on both sides of the conveyor section are arranged in two vertical loops, an inlet-side or front loop 3 and an outlet-side or rear loop 4. The upper ends of the front chain loops run over deflections which are arranged on vertically movable front carriages 5. Correspondingly, the upper ends of the rear chain loops run over deflections on vertically movable rear carriages 6. The deflections are designed, for example, as chain wheels. These vertically movable pairs of carriages and chain deflections are each mechanically connected to one another with a cross member. The front and rear movable carriages are positively guided on both sides in guide profiles 7. The guide profiles are arranged vertically and integrated in the frame. The front and rear vertically movable chain loops are mechanically coupled on each side by means of a pulling element 8. The pulling elements can be designed as a chain, rope or toothed belt and are deflected in the upper frame by means of two deflection rollers 9 and attached centrally to the carriage on both sides. The front chain loops can thus be moved vertically in opposite directions with the rear chain loops. If the front chain loops are extended vertically upwards, then the rear chain loops shorten vertically downwards by the same length and vice versa.

In the lower area, the two chains are deflected by three fixed shafts, each of which is equipped with a pair of chain wheels. The front lower shaft serves as a drive shaft 10 and is driven as an inlet drive with a servo motor 11. The middle lower shaft serves as an outlet drive 12 of the temporary store and is also driven by a servo motor 13. The rear lower shaft serves as a tension shaft 14 for the circulating continuous chain pair. For this purpose, this shaft is positioned downwards in a vertical direction via a threaded spindle mechanism 15 arranged in pairs in order to tension the chain pairs in a defined manner.

The pair of continuous chains is equipped in a circulating manner known per se with product carrier gondolas 16 suspended on bolts. At the inlet 17 of the temporary store, products arranged in rows 19 which are fed in frontally on a main belt 18 are moved onto provided product support trays 20. A certain speed is sufficient for this so that the individual products slide onto the provided tray. The inlet drive 10 moves the chain of the front chain loop vertically upwards in cycles, synchronized with the number of rows of products, which are fed in frontally. The products arranged in rows could also be served laterally and then inserted in the frontal direction.

The product carrier gondolas filled with products arranged in rows are organized in cycles upwards via the front, vertically movable chain deflection and reach the outlet level via the rear strand of the front loop leading downwards. The product outlet is located there and the products are pushed onto the transverse discharge belt 21 with a known ejector. On this ejector, the products reach the packaging machine in a lateral direction, possibly via downstream gap closing lines.

If the downstream packaging system stops, the temporary store can continue to receive products arranged in rows. For this purpose, the front movable chain deflections are moved upwards in the vertical direction, i.e. the front loop is extended upwards. At the same time, the rear loop is shortened downwards so that empty product carrier gondolas from the rear loop are available when the products are to be arranged in the store. The product carrier gondolas filled with products are always in the front loop and the empty product carrier gondolas are always in the rear loop. If the inlet rate and outlet rate are of an equal size, the filled front loop and the emptied rear loop do not change their position. Only a speed difference between the inlet rate and the outlet rate leads to a corresponding lengthening or shortening of the two loops. If the inlet rate is greater than the outlet rate, the temporary store is filled. This leads to an extension of the front loop upwards and a shortening of the rear loop downwards. If the inlet rate is smaller than the outlet rate, the store is emptied and the front loop is shortened downwards and the rear loop is extended upwards accordingly.

The fill level of the temporary store can be determined by means of an integrated electrical control device. Depending on the fill level, the speed of the packaging machines is regulated by setting the setpoint. The higher the fill level, the faster the downstream packaging machines run. Overfilling of the temporary store can thus be counteracted dynamically.

A main advantage of the temporary store according to the invention is the very small minimum filling. The minimum filling is the amount of rows of products that is necessary to fill the section from the inlet to the outlet of the temporary store. In the present case, this is only the section from the inlet level via the front chain deflection and back to the outlet level, i.e. only approx. 30 rows of products. This is about a factor of ten less than with known temporary stores of this type.

Since the temporary store according to the invention manages with only one loop, which is filled with product, its deflection diameter can be dimensioned comparatively large, without having a major influence on the external dimensions. Due to the large deflection diameter, the filled product carrier gondolas can be spaced much closer to one another without them colliding in the deflection. This leads to a significantly higher packing density of the product carrier gondolas on the chains and thus to a higher storage capacity. The reduced spacing between the gondolas enables higher cycle rates for the inlet and outlet of the temporary store. As a result, storage capacity and performance of the temporary store according to the invention are significantly higher than known from the prior art.

Another advantage of the temporary store according to the invention is that the reduced chain length means that fewer product carrier gondolas are in circulation. This also reduces the need for cleaning. If, depending on the size, four to six hours of cleaning time are required for known stores, according to the invention only about half this time is required for cleaning in the case of the temporary store. Since cleaning time is also dead time, in which production cannot be carried out, the new temporary store also contributes to a significant increase in efficiency.

In addition, less floor space and space is required to achieve a certain storage capacity, which also contributes to cost reduction.

The invention claimed is:

1. A temporary store in a product conveyor section with a circulating continuous chain on each side of the product conveyor section, which run through vertical chain loops via upper and lower deflections, and with product carrier gondolas with product carriers which are suspended on the chains being used to receive products incoming at a product inlet and to convey the products to a product outlet, wherein a first vertical chain loop running over an upper vertically movable deflection, conveying product carrier gondolas with products on them from the product inlet to the product outlet, a second vertical chain loop running over a second upper vertically movable deflection conveying empty product carrier gondolas from the product outlet towards the product inlet, and the upper deflections of the chain loops can be moved vertically in opposite directions.

2. The temporary store according to claim 1, wherein the inlet-side loop conveys filled product carriers from the product inlet to the product outlet and the outlet-side loop conveys emptied product carriers from the product outlet to the product inlet.

3. The temporary store according to claim 1, wherein the upper deflections are arranged on vertically movable carriages.

4. The temporary store according to claim 3, wherein the carriages are guided in vertically arranged rails.

5. The temporary store according to claim wherein the upper deflections of the two loops are connected to one another on both sides by pulling elements.

* * * * *